April 10, 1956 D. A. McCAULAY ET AL 2,741,647
SECONDARY ALKYLTOLUENE ISOMERIZATION
Filed Oct. 30, 1953
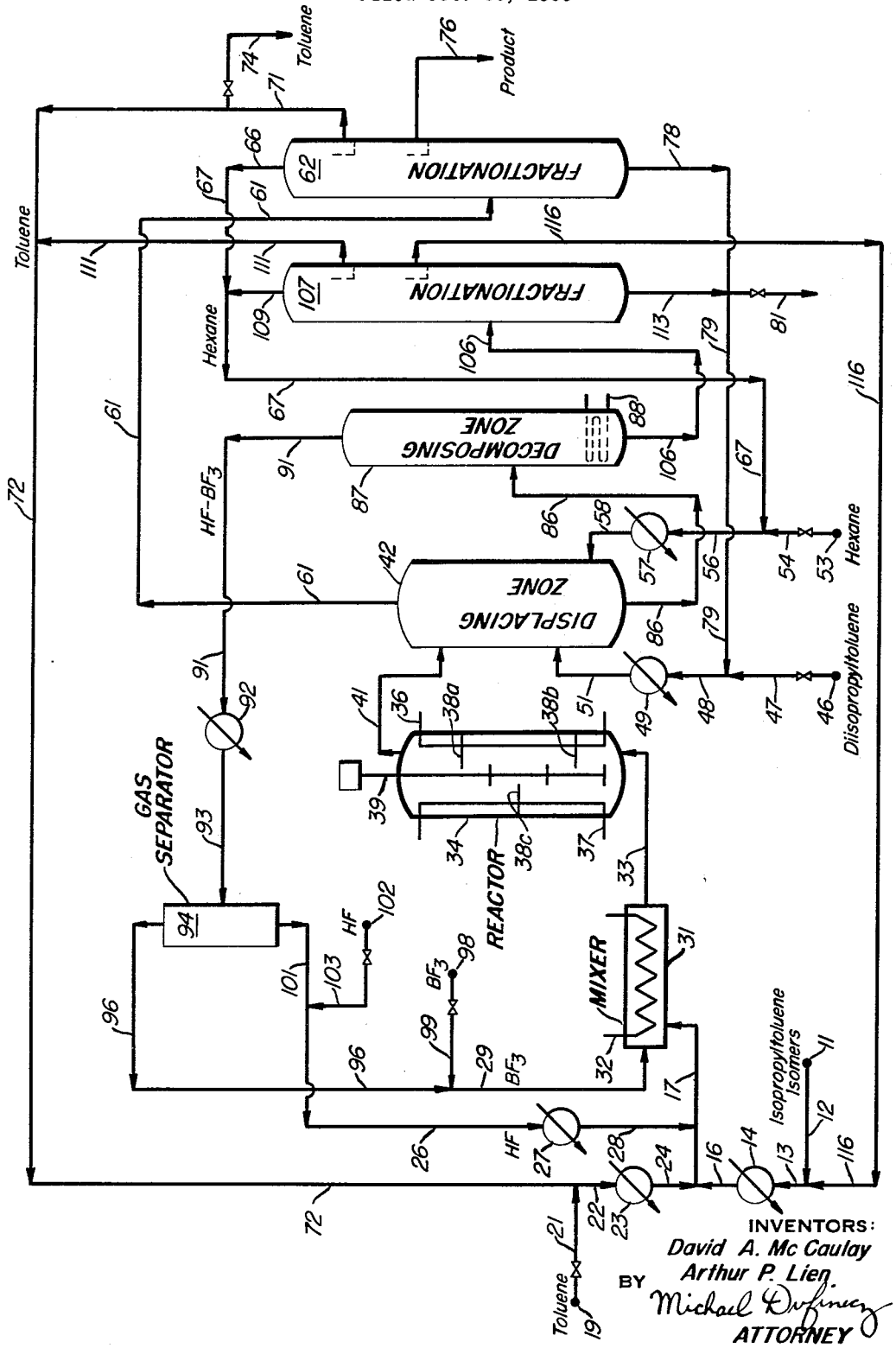
INVENTORS:
David A. McCaulay
Arthur P. Lien
BY Michael Dufinecy
ATTORNEY //United States Patent Office 2,741,647
Patented Apr. 10, 1956

2,741,647

SECONDARY ALKYLTOLUENE ISOMERIZATION

David A. McCaulay, Chicago, Ill., and Arthur P. Lien, Highland, Ind., assignors to Standard Oil Company, Chicago, Ill., a corporation of Indiana Application October 30, 1953, Serial No. 389,327

23 Claims. (Cl. 260—668)

This invention relates to the rearrangement of certain secondary alkyltoluenes. More particularly the invention relates to the isomerization and/or disproportionation of isopropyltoluene and secondary butyltoluene. Still more particularly the invention relates to the production of essentially pure meta isopropyltoluene (m-cymene) and 3,5-di-isopropyltoluene (3,5-di-isopropyl-1-methylbenzene).

The development of the hydroperoxide synthesis for phenol using isopropylbenzene as the starting material or substituted secondary alkylbenzenes has resulted in a demand for substituted secondary alkylbenzenes. Since certain phenols have particularly desirable properties for use as chemical intermediates, a demand has arisen for large quantities of various substituted secondary alkylbenzenes of high purity, i. e., about 95%, and also essentially pure, i. e., 99%, compounds. Of particular interest are meta isopropyltoluene and 3,5-di-isopropyltoluene. Meta isopropyltoluene is also of interest to the high polymer industry as a raw material for the manufacture of styrene type plastics having a softening point higher than that of polystyrene. The production of isopropyltoluene by the alkylation of toluene with propylene produces a mixture of the three isomers; therefore, industry is concerned with the preparation of high purity individual isomers of high yield.

It is an object of this invention to prepare di-secondary alkyltoluenes by the treatment of isopropyltoluene or secondary butyltoluene. Another object is the production of tri-secondary alkyltoluene by the treatment of the corresponding secondary alkyltoluene or di-secondary alkyltoluene. Still another object is a process for the conversion of secondary alkyltoluene to high purity meta di-secondary alkyltoluene without simultaneously producing any significant amount of tri-secondary alkyltoluenes. Yet another object of the invention is a process for the production of high purity meta secondary alkyltoluene from a feed containing at least one of the other isomers or mixtures of the meta isomer and substantial amounts of the other isomers. A further object is a process for the preparation of high purity meta secondary alkyltoluene without the simultaneous production of significant amounts of poly-secondary alkyltoluenes. A specific object is the preparation of essentially pure meta isopropyltoluene by the treatment of a mixture of isopropyltoluene isomers without simultaneously producing any appreciable amount of poly-isopropyltoluenes. Other objects will become apparent in the course of the detailed description of the invention.

ISOMERIZATION

The isomerization reaction considered herein is the shift of position of substituent alkyl groups on the benzene ring without rearrangement of the alkyl group itself. The isomerization process comprises contacting under substantially anhydrous conditions and in the substantial absence of reactive hydrocarbons a secondary alkyltoluene selected from the class consisting of the ortho isomer, the para isomer, and mixtures thereof with at least an effective amount of $BF_3$ and an amount of liquid HF at least sufficient to form a distinct acid phase; the contacting is carried out at a temperature of not more than about —20° C. for not more than about 30 minutes; as the temperature of contacting is lowered, the permissible maximum time of contacting may be increased; and removing HF and $BF_3$ from the acid phase under conditions to substantially avoid rearrangement reactions and recovering from the reaction product mixture a secondary alkyltoluene fraction containing the meta isomer. A feed, containing mixtures of the meta isomer and a substantial amount of at least one of the other isomers, when treated with at least about 1 mol of $BF_3$ per mol of secondary alkyltoluene charged, and other conditions as given above, produces a reaction mixture enriched with respect to the meta isomer relative to the charge to the process.

By carrying out the isomerization process in the presence of added toluene, the process may be carried out at temperatures as high as about +20° C. without producing appreciable amounts of disproportionation reaction products. It is preferred to use at least about 1 mol of added toluene per mol of secondary alkytoluene charged.

The charge to the low temperature isomerization process contains a secondary alkyltoluene selected from the class consisting of the ortho isomer, the para isomer, mixtures thereof, and natural mixtures of all three isomers. When using at least about 1 mol of $BF_3$ per mol of secondary alkyltoluene charged, the feed may contain mixtures of the meta isomer and a substantial amount of at least 1 other isomer.

In addition to the secondary alkyltoluene, the feed may contain nonreactive liquid hydrocarbons. It is to be understood that the term "non-reactive liquid hydrocarbons" is intended to mean those hydrocarbons which are liquid at operating conditions and which are inert to the action of the HF—$BF_3$ agent and do not participate in any reaction with the secondary alkyltoluene charged. Examples of reactive hydrocarbons are olefins, xylene, diethylbenzene, ethyltoluene and ethylbenzene. Examples of non-reactive hydrocarbons are: isopentane, butane and hexane. Surprisingly enough, benzene is non-reactive and may be present in the feed. It is preferred that toluene be absent from the feed as its presence has an adverse effect on the degree of disproportionation obtained.

The process utilizes substantially anhydrous liquid hydrogen fluoride. The liquid hydrogen fluoride should not contain more than about 2 or 3% of water. Commercial grade anhydrous hydrofluoric acid is suitable for this process.

Under the conditions of the process, poly-alkylbenzenes form a complex containing 1 mol of $BF_3$ and, it is believed, 1 mol of HF per mol of poly-alkylbenzene. Therefore, at least enough liquid HF must be present to participate in the formation of the complex with the secondary alkyltoluene; in addition to this amount, sufficient liquid HF must be present to dissolve the complex which has been formed. In general, the presence of a distinct separate acid phase in the contacting zone indicates that at least the minimum requirement of liquid HF has been met. More than this minimum amount of liquid HF is desirable. Usually between about 3 and 50 mols of liquid HF are utilized per mol of secondary alkyltoluene charged to the process. It is preferred to operate with between about 5 and 20 mols of liquid HF per mol of secondary alkyltoluene charged.

The isomerization process requires the presence of at least an amount of $BF_3$ sufficient to cause an appreciable amount of isomerization of the ortho and para isomers to the meta isomer. While amounts of $BF_3$ as small as 0.1 mol per mol of secondary alkyltoluene charged cause an appreciable amount of isomerization to take place, it is desirable to operate with more than this amount, e. g., about 0.5 mol of $BF_3$. As much as 5 or more mols of $BF_3$ may be used per mol of secondary alkyltoluene charged. Increasing the amount of $BF_3$ has an extremely beneficial effect on the degree of isomerization obtained. When slightly less than 1 mol of $BF_3$ per mol of secondary alkyltoluene charged is used, e. g., 0.9 mol, the reaction product mixture contains high purity meta secondary alkyltoluene as the secondary alkyltoluene fraction. In order to obtain the conversion of the secondary alkyltoluene charged to essentially pure meta secondary alkyltoluene, the process is operated with between at least 1 and about 2 mols of $BF_3$ per mol of secondary alkyltoluene charged.

When the feed to the process contains poly-alkylbenzenes in addition to the secondary alkyltoluene, 1 mol of $BF_3$ should be used per mol of said poly-alkylbenzene in addition to that set out above.

The process may be operated with two liquid phases present in the contacting zone. At high $BF_3$ usages, a gas phase may also be present in the contacting zone. The two liquid phases will be spoken of herein as the raffinate phase and the acid phase. The acid phase consists of liquid HF, $BF_3$, complex and dissolved hydrocarbons. The raffinate phase may be secondary alkyltoluenes in excess of that amount taken into the acid phase, or may be a mixture of secondary alkyltoluene and inert hydrocarbons, or may be principally inert hydrocarbons. In the absence of substantial amounts of inert hydrocarbons, the amount of raffinate phase is dependent upon the amount of $BF_3$ utilized. When using about 1 mold of $BF_3$ per mol of secondary alkyltoluene, e. g., 0.9, and in the substantial absence of inert hydrocarbons, all or virtually all the secondary alkyltoluene will be taken into the acid phase either in the form of a complex or in solution. The presence of HF-$BF_3$-poly-alkylbenzene complex in liquid HF very greatly increases the solubility of the liquid HF for aromatic hydrocarbons and increases slightly the solubility of paraffinic hydrocarbons.

The presence of a raffinate phase consisting principally of inert hydrocarbons, such as benzene and paraffins, has an adverse effect on the degree and direction of conversion of the secondary alkyltoluene charged, even though theoretically sufficient $BF_3$ is present to complex all of the secondary alkyltoluene charged. A substantial amount of the secondary alkyltoluene will remain in the raffinate phase, even when using somewhat more than 1 mol of $BF_3$ per mol of secondary alkyltoluene charged. The secondary alkyltoluene in the raffinate phase does not undergo a rearrangement reaction to any significant extent, even under conditions of good agitation. The presence of dissolved inert hydrocarbons in the acid phase does not appear to have any adverse effect on the degree or direction of the rearrangement reactions.

In order to maximize the yield of conversion products, and to produce a secondary alkyltoluene product fraction consisting substantially of meta-di-secondary alkyltoluene, it is preferred to operate under conditions which form a single essentially homogeneous liquid phase in the contacting zone. A single essentially homogeneous liquid phase is attainable with a feed containing as much as 3 volume percent of paraffinic hydrocarbons. Large amounts of benzene and toluene may be dissolved in the acid phase, as much as 1 mol or more, per mol of complexed polyalkylbenzene, depending on the amount of complex in the acid phase. (It is to be understood that a separate gaseous $BF_3$ phase may also be present, but it is preferred that a minimum of free space be present in the contacting zone and that sufficient pressure be maintained to insure that essentially all the $BF_3$ is either in the complexed form or is in physical solution in the acid phase.)

The isomerization reaction considered herein is the shift of position of substituent alkyl groups on the benzene ring without rearrangement of the alkyl group itself. This isomerization reaction proceeds at a much faster rate, at lower temperatures, than does the reaction wherein alkyl groups are transferred from one benzene ring to another benzene ring, i. e., disproportionation. It is possible by suitably adjusting the temperature and time of contacting to essentially avoid the formation of disproportionation products and limit the course of the rearrangement reaction to isomerization alone. (It is to be understood that the term "to essentially avoid" is intended to mean within the error of the analytical procedures now available to the art, for example, ultraviolet and infrared techniques.)

At temperatures of not more than about $-20°$ C. it is possible, by limiting the contacting time to not more than about 30 minutes, to isomerize substantially all the ortho and/or para isomers present in the charge to the corresponding meta isomer, when at least about 1 mol of $BF_3$ is used per mol of secondary alkyltoluene charged. As the temperature of contacting is lowered, the permissible time of contacting may be lengthened without formation of appreciable amounts of the undesired disproportionation reaction products. When the process is operated at about $-20°$ C. for a time of not more than about 5 minutes, the reaction product mixture contains essentially no disproportionation reaction products; at a $BF_3$ usage of at least 1 mol of $BF_3$ per mol of secondary alkyltoluene charged, and these conditions of time and temperature, essentially pure meta secondary alkyltoluene is obtained as the reaction product. At contacting zone temperature of about $-30°$ C. the maximum permissible contacting time is about 10 minutes.

Obviously operation at these low temperatures and very short contacting times has a serious effect on the commercial practicality of this isomerization process. It has been found that the presence of toluene in the feed to the process has a remarkable effect on the rate at which disproportionation proceeds. The presence of substantial amounts of toluene in the charge slows down the disproportionation reaction rate to such an extent that it is possible to essentially eliminate the products of disproportionation at temperatures where substantial quantities of the di-secondary alkyltoluene would have been formed, in the absence of added toluene.

The isomerization process can be carried out without formation of appreciable amounts of disproportionation products at temperatures of not more than about $+20°$ C. when the charge to the process comprises essentially the defined secondary alkyltoluene and toluene. The amount of disproportionation products formed is dependent upon the temperature, time and amount of toluene added; it is preferred to use at least about 1 mol of added toluene and preferably the maximum amount soluble in the acid phase should be used. When operating with about 1 mol of toluene in the feed per mol of secondary alkyltoluene present therein, the isomerization process may be carried out at about $+20°$ C. for an about 5 minute maximum contacting time; at about $0°$ C. for an about 30 minute maximum contacting time, and at about $-20°$ C. for an about 2 hour maximum contacting time. Under this relationship of temperature and time, and at least 1 mol of $BF_3$ per mol of secondary alkyltoluene charged, an essentially pure meta secondary alkyltoluene product is obtained, without forming any appreciable amount of the corresponding di-secondary alkyltoluene disproportionation product.

Mixtures of the isomers or the individual non-symmetrical isomers of di-secondary alkyltoluene are isomerized to the symmetrical configuration, i. e., 3,5-di-secondary alkyl-1-methylbenzene. By the use of at least 1 mol of $BF_3$ per mole of di-secondary alkyltoluene and sufficient liquid HF to form an essentially single liquid homogeneous phase and a temperature between about $+10°$ and $+30°$ C. and a suitably short time, it is possible to obtain essentially pure 3,5-di-secondary alkyltoluene as the reaction product, to the essential exclusion of disproportionation to tri-secondary alkyltoluene.

The invention is limited to the HF—BF$_3$ treatment of isopropyltoluene isomers and secondary butyltoluene isomers because successful treatment of the secondary pentyltoluenes requires very different operating conditions. Even at temperatures on the order of +20° C. and contacting times as short as 15 minutes, the secondary pentyltoluenes undergo rearrangement of the pentyl group and also cracking of the pentyl group. In addition, cyclization reactions occur and substantial quantities of indanes and tetralins are formed. Rearrangement of the pentyl group is particularly prominent when 3-tolylpentane is the charge to the HF—BF$_3$ contacting zone. The 3-tolylpentane isomerizer to give good yields of the 2-tolylpentane derivative, particularly the 1 methyl-2,4 bis(2-pentyl) benzene disproportionation product. Rearrangement of the pentyl group is not present to any large extent when 2-tolylpentane is the charge to the HF—BF$_3$ contacting zone. It is to be understood that by suitable adjustment of the temperature and time of contacting it is possible to minimize side reactions.

DISPROPORTIONATION

In this process a secondary alkyltoluene selected from the class consisting of isopropyltoluene and secondary butyltoluene is contacted under substantially anhydrous conditions and in the substantial absence of reactive hydrocarbons with at least an effective amount of BF$_3$, preferably about 1 mol per mol of sec-alkyltoluene, and an amount of liquid HF at least sufficient to form a distinct acid phase, preferably about 5 to 20 mols per mol of sec-alkyltoluene; the contacting is carried out at a temperature between about —20° C. and about +80° C. for a time at least sufficient to permit an appreciable amount of rearrangement reaction; the HF and BF$_3$ are removed from the acid phase in order to recover poly-secondary alkyltoluenes and a secondary alkyltoluene fraction enriched in the meta isomer, with respect to the meta isomer content of the secondary alkyltoluene charged (unless essentially pure meta secondary alkyltoluene is charged).

By operating for a sufficiently short time at a temperature between about —20° C. and about +30° C., production of tri-secondary alkyltoluene can be subsequently eliminated. Operation at temperatures below about —20° C. substantially halts the disproportionation reaction.

The charge to the disproportionation process contains secondary alkyltoluenes selected from the class consisting of isopropyltoluene and secondary butyltoluene. The feed may contain any one or all of the isomers of the particular secondary alkyltoluene. In order to obtain products containing only one particular alkyl substituent, the feed must contain essentially only either isopropyltoluene or secondary butyltoluene as the reactive component.

The type of, and the amounts of liquid HF used in the disproportionation process are the same as those described in the isomerization process.

The process requires the presence of at least an amount of boron trifluoride, sufficient to cause a rearrangement reaction to take place, specifically the disproportionation of the secondary alkyltoluene to poly-alkyltoluene. While amounts of BF$_3$ as small as 0.1 mol per mol of secondary alkyltoluene charged will cause an appreciable amount of rearrangement reaction to take place, it is desirable to operate with about 0.5 mol of BF$_3$. Still more BF$_3$ has a beneficial effect on the degree of the rearrangement reaction and as much as 5 or more mols may be used per mol of secondary alkyltoluene charged. When high purity 3,5-di-secondary alkyltoluene is a desired product, at least about 1 mol of BF$_3$ should be used per mol of secondary alkyltoluene charged, and it is preferred to use between at least 1 and about 2 mols of BF$_3$ per mol of secondary alkyltoluene charged.

When the feed to the process contains poly-alkylbenzenes in addition to the secondary alkyltoluene, 1 mol of BF$_3$ should be used per mol of said poly-alkylbenzene in addition to that set out above.

Although the disproportionation process may be carried out in two liquid phase system, it is preferred to operate with a single essentially homogeneous phase system.

The degree and direction of the disproportionation reaction are also determined by the temperature of contacting and the time of contacting; a definite relationship exists between the temperature, time and desired disproportionation products. At temperatures below about —25° C. no appreciable disproportionation takes place even at contacting times of several days. At temperatures of 100° C. or higher, side reactions such as alkyl group cracking occur and the direction of the disproportionation changes; this is evidenced by the production of a wide boiling range product mixture. The practical upper limit for the operation of the disproportionation process is about +80° C. Appreciable amounts of disproportionation product are obtained in a not excessively long time at a temperature of about —20° C. The preferred range of operating temperatures for the disproportionation process is between about +10° C. and about +60° C.

The contacting time has an important effect on the course of the rearrangement reactions. At least sufficient time must be provided at the particular temperature of operation in order to obtain an appreciable amount of disproportionation products. As the contacting time is increased, at a constant temperature, the amount of disproportionation product increases. The disproportionation reaction appears to produce the di-secondary alkyltoluene as the first product. Dependent upon the temperature, a finite period of time elapses between the appearance of detectable amounts of the di-secondary alkyltoluene product and the appearance of the tri-secondary alkyltoluene product. The lower the temperature of operation, the longer the time lapse between the appearance of the di-derivative and the appearance of the tri-derivative.

With increasing contacting time, at constant temperature, the amount of poly-secondary alkyltoluene product gradually increases at the expense of secondary alkyltoluene charged. Gradually the amount of the tri-derivative increases and eventually the tri-derivative continues to increase with simultaneous disappearance of the di-derivative. At higher temperatures and prolonged contacting times, the reaction product mixture contains the tri-derivative as the predominant disproportionation reaction product. Even at +80° C. and prolonged contacting times, some secondary alkyltoluene and some di-secondary alkyltoluene will be found in the reaction product mixture. Thus by adjusting the temperature and time of contacting, it is possible to control the relative amounts of di- and tri-derivatives produced in the disproportionation process.

The disproportionation reaction can be controlled, within experimental error, to produce di-secondary alkyltoluene as essentially the only poly-secondary alkyltoluene product. When the di-secondary alkyltoluene is the only desired poly-secondary alkyltoluene disproportionation product, the contacting temperature should not exceed about +30° C. The lower temperature of operation is about —20° C.

The contacting time at +30° C. must be short enough to essentially eliminate the disproportionation to the tri-derivative. At about +30° C. the permissible maximum time of contacting is about 5 minutes to essentially avoid the formation of the tri-derivative. The lower the temperature of contacting, the longer the contacting time permissible while avoiding the formation of detectable amounts of the tri-derivative. At about +10° C. contacting temperature, the permissible maximum time is about 60 minutes; at about −20° C., the permissible maximum contacting is several days. Thus in order to avoid the formation of appreciable amounts of tri-secondary alkyltoluene, the disproportionation process must be carried out, at a temperature of about +30° C., for a maximum contacting time of about 5 minutes. The lower the temperature of contacting, the longer will be the corresponding permissible maximum contacting time.

Even when using smaller amounts of $BF_3$, the predominant di-secondary alkyltoluene product is the 3,5-di-secondary alkyltoluene, i. e., the symmetrical configuration. The use of slightly less than 1 mol of $BF_3$ per mol of secondary alkyltoluene charged gives a di-secondary alkyltoluene product fraction consisting substantially of 3,5-di-secondary alkyltoluene which is described as high purity, 3,5-di-secondary alkyltoluene (3,5-di-secondary alkyl-1-methylbenzene). The use of at least 1 mol of $BF_3$ and preferably somewhat more, e. g., 1.3 mols, gives essentially pure 3,5-di-secondary alkyltoluene as the secondary alkyltoluene product. By careful control of the contacting time it is possible to produce a di-secondary alkyltoluene product fraction which is, within the error of the analytical procedure, pure 3,5-di-secondary alkyltoluene.

When the charge to the disproportionation process consists of the ortho isomer, the para isomer, mixtures thereof, and mixtures of the meta isomer and at least one other isomer, which other isomer is present in substantial amounts, the acid phase contains a reaction product mixture wherein the secondary alkyltoluene fraction is enriched with respect to the meta isomer when compared with the charge. When operating under essentially single liquid phase conditions and with at least 1 mol of $BF_3$ per mol of secondary alkyltoluene charged, the reaction product mixture contains essentially pure meta secondary alkyltoluene as the secondary alkyltoluene component, i. e., the ortho and/or para isomers are isomerized to the meta isomer.

When the charge to the disproportionation process described above is a secondary alkyltoluene selected from the class consisting of isopropyltoluene and secondary butyltoluene, the reaction product mixture contains relatively large amounts of the di-secondary alkyl derivative even though high temperatures and long contacting times are used. The use of secondary alkyltoluene as the charge results, at long contacting times, in a mixture wherein the di-secondary alkyltoluene is a major component of the reaction product mixture.

When it is desired to maximize the yield of the tri-secondary alkyltoluene product fraction, the charge to the disproportionation process should be the corresponding di-secondary alkyltoluene. The use of an isomer or a mixture of isomers of di-secondary alkyltoluene which are selected from the class consisting of di-isopropyltoluene and di-secondary butyltoluene as the charge to a disproportionation process, wherein sufficient liquid HF and $BF_3$ are used to form a single essentially homogeneous phase, at a temperature between about +30° and +60° C. for a suitably long contacting time, results in a reaction product mixture wherein the di-secondary alkyltoluene forms only a minor part of the reaction product mixture.

PRODUCT RECOVERY

The reaction product mixture may be recovered from the acid phase by various methods. Probably the simplest procedure and one most suitable for laboratory work consists of adding the acid phase to crushed ice or the acid phase may be contacted with cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining HF and $BF_3$ occluded therein.

Both HF and $BF_3$ are relatively expensive chemicals and it is desirable in an economic process to recover these and to recycle them for reuse in the process. The HF and the $BF_3$ may be readily removed from the acid phase by heating the acid phase or by applying a vacuum thereto. The HF and the $BF_3$ distill overhead and may be recovered for reuse in the process. When di-alkylbenzenes and/or tri-alkylbenzenes are the principal complex forming hydrocarbons, the complex may be decomposed at relatively low temperatures by the use of vacuum distillation. The tetra alkylbenzene and higher alkylbenzene complexes are stable and must be heated to relatively high temperatures, for example, 150° C. or more in order to decompose the complex.

The rearrangement reaction proceeds from the time that the complex is formed until the complex is decomposed, assuming that a suitable temperature exists. When it is desired to produce essentially only one rearrangement reaction product, for example, meta isopropyltoluene from para isopropyltoluene, or 3,5-di-isopropyltoluene from isopropyltoluene, it is necessary to take into account the total time elapsing from the time that the complex of isopropyltoluene and HF—$BF_3$ has been formed till the time that it has been decomposed in the distillative decomposition procedure. Thus, when using distillative decomposition procedure, it is necessary to consider the residence time of the complex in the decomposing zone as a part of the contacting time. Also, it is necessary to consider the temperature maintained in the decomposing zone when a particular product or a particular ratio of products is desired. Generally the temperature in the decomposing zone should be no higher than that in the contacting zone, when operating to produce meta secondary alkyltoluene. The distillative decomposing zone may be operated at temperatures as low as about −20° C. by the use of high vacuum therein.

The di-secondary alkyltoluene at moderate temperatures disproportionates very slowly to the tri-secondary alkyltoluene. Therefore it is possible to distillatively decompose the complex of di-secondary alkyltoluene at temperatures as high as 40 or 50° C. if the acid phase is very rapidly raised to that temperature from the reaction temperature of below about +30° C. and the HF and $BF_3$ are very quickly removed from the heated acid phase.

Thus the recovery of the meta secondary alkyltoluene product without back isomerization to ortho and para isomers or disproportionation to the di-secondary alkyltoluene is the most difficult recovery to be made by distillative decomposition of the complex. It is obvious that operation at very low temperatures such as 0° C. or lower involves an expensive high vacuum operation since liquid HF boils at +20° C. at atmospheric pressure.

The preferred method of recovering high purity meta secondary alkyltoluene from an acid phase without back isomerization or disproportionation is the displacement of the meta secondary alkyltoluene from its HF and $BF_3$ complex by an alkylbenzene which forms a more stable HF and $BF_3$ complex. Broadly, the displacer is a polyalkylbenzene containing at least three alkyl groups which alkyl groups are selected from the class consisting of normal and secondary and which contain not more than 4 carbon atoms. Normal alkyl groups are methyl, ethyl, n-propyl and n-butyl. The secondary alkyl groups are isopropyl and secondary butyl.

Pentamethylbenzene and hexamethylbenzene are particularly effective displacers. However, the complexes formed by these compounds are so stable that quite elevated temperatures are necessary to decompose the complexes in order to recover the HF and $BF_3$. Therefore, where economy is desirable, these compounds should not be used as displacers.

The preferred tri-alkylbenzenes have the symmetrical configuration, i. e., 1,3,5-tri-alkylbenzene. The preferred tetra-alkylbenzenes possess the 1,2,3,5 configuration. These displacers are preferred because they do not tend to undergo rearrangement reactions and have better displacement effectiveness than the other isomers. The preferred displacers are mesitylene, tri-isopropylbenzene, di-isopropyltoluene and isodurene.

As it is normally impractical to operate under conditions wherein absolutely no di-secondary alkyltoluene is produced, it is desirable to operate with a displacer which will not complicate the problem of recovering the by-product, di-secondary alkyltoluene. Therefore it is preferred to use as the displacer in the process of this invention a poly-secondary alkyltoluene, for example, di-isopropyltoluene, or di-secondary butyltoluene, corresponding to the alkyl groups charged.

Theoretically, 1 mol of added displacer will replace 1 mol of secondary alkyltoluene. However, greater amounts of displacer should be used. The amount of displacer used is dependent upon the total recovery of secondary alkyltoluene desired and also the effectiveness of the contacting of the acid phase and the displacer. It is preferred to operate with between about 2 and 4 mols of displacer per mol of secondary alkyltoluene present in the acid phase.

It has been pointed out before that the acid phase possesses an extremely high solubility for aromatic hydrocarbons. Quite a large amount of displacer can be added to the acid phase without apparently displacing any secondary alkyltoluene; the displaced secondary alkyltoluene remains dissolved in the acid phase. By the use of very large amounts of displacer, it is possible to produce a second liquid phase which comprises displaced secondary alkyltoluene and displacer.

Since paraffinic hydrocarbons are soluble in the acid phase to only a relatively small extent, it is possible to wash from the acid phase-displacer solution the displaced secondary alkyltoluene. The wash hydrocarbon must be inert to the action of HF and BF$_3$ and non-reactive with the alkylbenzenes present in the acid phase. Benzene and toluene may be used as wash hydrocarbons. It is preferred to use as the inert hydrocarbon a low boiling liquid paraffin such as propane, butane, pentane and hexane.

The wash hydrocarbon may be introduced into the acid phase-displacer solution simultaneously with the displacer, preferably as a single solution; or the wash hydrocarbon may be introduced into the acid phase after the addition of the displacer. In order to avoid rearrangement reactions, it is preferred to introduce the wash hydrocarbon substantially simultaneously after the introduction of the displacer.

It is preferred to carry out the displacement operation in a continuous countercurrent tower; in such an operation the acid phase is introduced in an upper portion of the tower, the displacer is introduced at a lower portion of the tower and the inert wash hydrocarbon is introduced at a point of the tower below the point of entry of the displacer.

The amount of inert wash hydrocarbon introduced must be enough to remove substantially all the displaced secondary alkyltoluene. In general, the amount of inert wash hydrocarbon used is between about 50 and 500 volume percent based on secondary alkyltoluene displaced, preferably between about 100 and 250 volume percent.

In order to avoid rearrangement reactions, the displacing zone should be operated at a temperature and for a contacting time such that essentially no rearrangement reactions take place therein. Thus, the contacting time in the displacing zone and the temperature therein must be considered in determining the total contacting time to be utilized in the process.

EXAMPLES

The results obtainable by the invention are illustrated by several examples set out below. The tests were carried out using a carbon steel reactor provided with a 1725 R. P. M. stirrer. The order of addition of materials to the reactor was: (1) para cymene or para cymene and toluene of CP quality (2) commercial grade anhydrous liquid HF and (3) commercial grade BF$_3$. The contents of the reactor were agitated during the addition of the HF—BF$_3$; the agitation was continued while the reactor was brought to the desired contacting temperature and maintained during the contacting time. All the tests were carried out under conditions such that only one liquid phase was present in the reactor. The contents of the reactor were withdrawn into a polyethylene vessel filled with crushed ice. An upper aqueous hydrocarbon layer formed above a lower aqueous layer. The hydrocarbon layer was decanted and washed with dilute ammonia hydroxide solution to remove HF and BF$_3$. The neutral hydrocarbons were water washed to remove traces of ammonium hydroxide.

The hydrocarbons recovered from the reactor were fractionated in a laboratory distillation column provided with about 30 theoretical plates. Each product fraction was analyzed by a combination of boiling point, specific gravity, refractive index, and ultra-violet and infrared technique.

Tests were also carried out wherein the hydrocarbons were recovered from the acid phase by distillative decomposition thereof and by the displacement procedure using mesitylene as the displacer.

The results of these tests are set out in the table.

*Test 1*

In this test the contacting was continued for 30 minutes at —20° C. The reaction product mixture contained about 6 mol percent of 3,5-di-isopropyltoluene. Within experimental error no other isomer of di-isopropyltoluene was present. The isopropyltoluene product fraction consisted almost entirely of the meta isomer. Only trace amounts of the para isomer were found. Even at this low temperature, the para isopropyltoluene charged isomerized essentially completely to the meta configuration.

At this fairly long contacting time of 30 minutes, about 10% of the isopropyltoluene charged had disproportionated to di-isopropyltoluene.

*Test 2*

This run was carried out under conditions very much like those of Test 1 except that the contacting temperature was +13° C. In this test 39% of the reaction product mixture consisted of 3,5-di-isopropyltoluene. No detectable amounts of tri-isopropyltoluene or higher boiling materials were found. The isopropyltoluene product fraction consisted essentially of the meta isomer.

In this test 72% of the cymene charged had disproportionated to di-isopropyltoluene. The product mixture contained only 27% of isopropyltoluene. Tests 1 and 2 show that in the absence of added toluene, it is necessary to operate at low temperatures, in order to obtain isomerization of the para isomer to the meta isomer without simultaneously obtaining substantial amounts of disproportionation reaction products.

*Test 3*

In this test about equal molar amounts of para cymene and toluene were charged. A very large excess of BF$_3$ was also used. The connecting temperature and time were the same as those used in Test 2, i. e., +13° C. and 30 minutes.

TABLE

| Test No. | 1 | 2 | 3 | 4a | | 5b | 6 |
|---|---|---|---|---|---|---|---|
| Charge: | | | | | | | |
| p-Cymene, mols | 1.60 | 2.25 | 1.27 | 0.64 | | 1.3 | 1.0 |
| Toluene, mols | none | none | 1.46 | 0.70 | | 1.5 | 1.1 |
| Toluene/Cymene mol ratio | | | 1.15 | 1.09 | | 1.15 | 1.1 |
| HF/Cymene mol ratio | 15.6 | 15.5 | 27.5 | 27.4 | | 26.9 | 27.1 |
| BF$_3$/Cymene mol ratio | 1.50 | 1.19 | 2.32 | 2.19 | | 2.19 | 2.30 |
| Temperature, °C | −20 | +13 | +13 | +13 | | +12 | +52 |
| Time, Minutes | 30 | 30 | 30 | 30 | | 30 | 30 |
| Reaction Product Mixture, mol percent: | | | | Raffinate | Acid Phase | | |
| Toluene | 4.4 | 34 | 55 | 46 | 73 | 61.4 | 61 |
| o-isopropyltoluene | 0 | 0 | 0 | 0 | 0 | 0.6 | 0 |
| m-isopropyltoluene | 89.5 | 27 | 38 | 53 | 6 | 21.6 | 22.5 |
| p-isopropyltoluene | Trace | ca. 0.1 | ca. 0.2 | 1 | ca. 1 | 5.6 | ca. 0.2 |
| 3,5-di-isopropyltoluene | 6.1 | 39 | 7 | 0 | 20 | 10.8 | 12.6 |
| Tri-isopropyltoluene | 0 | 0 | 0 | 0 | 0 | 0 | 3.7 |
| Cymene disproportionated, percent | 10 | 72 | 18 | 13 | | 40 | 52 | a Displacement procedure. 95% of isopropyltoluene taken into raffinate phase (see text).
b Distillative decomposition procedure using 135 minute total time at +20° C. (see text).

The reaction product mixture contained only 7% of 3,5-di-isopropyltoluene and about 38% of essentially pure meta-isopropyltoluene. The presence of about 1 mol of toluene per mol of para cymene charged limited the disproportionation in this test to 18% of the cymene charged. This is a dramatic contrast with the 72% disproportionation obtained in Test 2, which is essentially identical with Test 3 except for the presence of added toluene in Test 3.

*Test 4*

Test 4 was carried out at essentially the same operating conditions as Test 3. However, the reaction product mixture was recovered by the displacement procedure.

In this test the displacing solution consisted of 1.35 mols of mesitylene and 290 ml. of n-pentane. This solution was cooled to the reaction temperature of +13° C. and was added to the reactor immediately after the 30 minute contacting time. The total contents of the reactor were agitated for 10 minutes at about +13° C.; then the contents of the reactor were allowed to settle for 10 minutes. At the end of the settling time each layer present in the reactor, i. e., raffinate phase and acid phase were withdrawn separately into polyethylene vessels filled with crushed ice. The hydrocarbons were recovered separately from each phase. In this test 2.4 mols of mesitylene were used per mol of isopropyltoluene present in the reaction product mixture. The n-pentane useage was 340 volume percent based on the isopropyltoluene present in the reactor.

The raffinate phase consisted of toluene, meta isopropyltoluene, a very slight amount of para isopropyltoluene, 12% of the mesitylene charged and essentially all of the n-pentane charged.

The hydrocarbons recovered from the acid phase consisted of a slight amount of n-pentane, 88% of the mesitylene charged and isopropyltoluene fraction consisting of the meta isomer and an appreciable amount of di-isopropyltoluene. The disproportionation taking place in this run was about 13% of the cymene charged, which amount is in excellent agreement with the results obtained in Test 3.

This test shows that little or no further reaction occurs with respect to the displaced isopropyltoluene after the displacing solution has been added to the acid phase, even though the displacing solution and the acid phase are intensely agitated for some minutes after the initial addition.

*Test 5*

This test was carried out under conditions essentially identical with those of Test 3. However, the reaction product mixture of hydrocarbons was recovered from the single homogeneous phase by distillative decomposition thereof.

At the completion of the 30 minute contacting time, the temperature of the reactor was raised to +22° C.—room temperature—and a vacuum applied to the reaction zone. The vapors were withdrawn from the reactor as rapidly as the overhead line would permit. Owing to the small size of the overhead line, the distillative decomposition took 135 minutes to remove all the HF and BF$_3$ from the reactor.

In this test 40% of the cymene charged was disproportioned to 3,5-di-isopropyltoluene. Also, the para cymene charged was isomerized to a mixture of all 3 cymene isomers. The isopropyltoluene product fraction contained measurable amounts of the ortho isomer as well as a large amount of the para isomer; the meta isomer was the predominant component.

A comparison of the Tests 3 and 5 indicates that owing to the long decomposition time at +22° C. the amount of disproportionation was doubled and also a considerable amount of back-isomerization of the meta isomer to para isomer as well as isomerization to the ortho isomer of isopropyltoluene had taken place.

This test shows that it is necessary to carry out the distillative composition at low temperatures and at a very rapid rate of HF and BF$_3$ removal in order to avoid undesired isomerization and disproportionation reactions.

*Test 6*

This test was carried out to observe the effect of elevated temperature on the disproportionation of isopropyltoluene in the presence of added toluene. This test was carried out for 30 minutes at a contacting temperature of +52° C. The reaction product mixture contained about 13% of 3,5-di-isopropyltoluene and about 4% of tri-isopropyltoluene. The total disproportionation was 52% of the isopropyltoluene charged.

This test shows very graphically the adverse effect on the degree of disproportionation of the presence of added toluene. In Test 2, which was carried out at a 40° lower temperature, in the absence of added toluene, 72% of the isopropyltoluene charged was disproportionated.

In spite of the relatively low amount of disproportionation, approximately 20% of the disproportionation product consisted of the tri-isopropyltoluene. This test indicates that at elevated temperatures the disproportionation reactions tend to form tri-isopropyltoluene at the expense of the di-isopropyltoluene. The isopropyltoluene present in the reaction product mixture is about the same in Tests 2 and 6.

ILLUSTRATIVE EMBODIMENT

The annexed figure, which forms a part of this specification, shows an illustrative embodiment of a method of carrying out the invention to produce essentially pure meta isopropyltoluene by isomerizing the ortho and para isomers. The figure is schematic and many items of equipment have been omitted, such as pumps, valves, etc., as these may be readily added thereto.

One thousand gals. a day of feed from source 11 are passed by way of lines 12 and 13 into heat exchanger 14. From exchanger 14 the feed and recycled isopropyltoluene isomers, 50 gals. per day, are passed by way of line 16 into line 17. In this embodiment, the feed consists of a mixture of all the isomers of isopropyltoluene which have been obtained by the alkylation of toluene with propylene, in the presence of aluminum chloride catalyst; this mixture contains about 50% of the meta-isomer. (In an integrated operation, the total reaction product consisting of toluene, isopropyltoluene isomers and di-isopropyltoluene isomers may be charged to the HF—$BF_3$ isomerization process, thereby avoiding a fractionation operation.)

Toluene from source 19 is passed by way of valved line 21 and line 22 into heat exchanger 23. From exchanger 23, the added toluene and recycled toluene are passed by way of line 24 into line 17. Ordinarily, the amount of toluene from source 19 will be limited to that needed to replace losses. The toluene in line 17 is 940 gals./day (1.3 mols per mol of isopropyltoluene).

Anhydrous liquid hydrogen fluoride, 1900 gals./day (14 mols/mol of isopropyltoluene) is passed from line 26, through heat exchanger 27 and line 28 into line 17. Heat exchangers 14, 23 and 27 lower the temperature of the isopropyltoluene, toluene and the liquid HF to a temperature of about 0° C. This temperature is about 5° C. lower than the desired reaction temperature of +5° C.

The contents of line 17 are introduced into mixer 31 which is provided with heat exchanger means 32. 4600 lbs. per day of $BF_3$ (1.2 mols/mol of isopropyltoluene) from line 29 is introduced into mixer 31. Mixer 31 is an apparatus able to rapidly intermingle the isopropyltoluene, toluene, liquid HF and $BF_3$. The reaction of the isopropyltoluene, HF and $BF_3$ to form the HF—$BF_3$-isopropyltoluene complex is highly exothermic. The heat exchanger means 32 withdraws heat and prevents the temperature at the discharge end of mixer 31 rising above +5° C.

An acid phase consisting of liquid HF, dissolved complex, toluene and $BF_3$ is discharged from mixer 31. About 100 p. s. i. g. of pressure are maintained on the system to keep the excess $BF_3$ in the acid phase. The single homogeneous acid phase is passed from mixer 31 by way of line 33 into reactor 34.

Reactor 34 is provided with heat exchanger means 36 and 37. Agitation is not needed to assist the reaction rate because of the single phase system existing in the reactor. To insure the maintenance of a substantially uniform temperature of +5° C. throughout the reactor, reactor 34 is provided with baffles 38a, 38b and 38c and motor driven agitator 39.

The acid phase is withdrawn from the top of reactor 34 and is passed by way of line 41 into the upper portion of displacing zone 42. The rearrangement reaction begins as soon as the isopropyltoluene complex is formed and continues until the meta isopropyltoluene is displaced from the complex by di-isopropyltoluene. Therefore, the contacting time is measured as the time in mixer 31, reactor 34 and part of the total time in displacing zone 42. In this embodiment, a total time of about 30 minutes is utilized. Under these conditions no significant amount of di-isopropyltoluene is formed. (Other methods for complex formation, for temperature control and for obtaining the proper amount of contacting while avoiding disproportionation may be readily devised.)

Displacing zone 42 consists of a vertical vessel adapted for intimate contacting of two immiscible phases in a continuous countercurrent manner. (Other methods of contacting may be used.) In this embodiment, the displacer is 1,3,5-di-isopropyltoluene which may be obtained from another operation but preferably is made by initially operating the process to produce 1,3,5-di-isopropyltoluene as the predominant reaction product. 1,3,5-di-isopropyltoluene from source 46 is passed by way of lines 47 and 48 into heat exchanger 49. Ordinarily sufficient displacer is made in the process to exceed the operational losses and "outside" displacer will be used only at the start-up of the process. The contents of line 48, i. e., "outside" and/or recycled di-isopropyltoluene, are cooled in heat exchanger 49 to a temperature of +5° C. and are then introduced by way of line 51 into a lower intermediate portion of displacing zone 42. In this embodiment, 3300 gals./day of displacer are introduced into displacing zone 42, i. e., 2.4 mols per mol of isopropyltoluene introduced therein from line 41.

The very great solvent power of the liquid HF-complex solution for aromatic hydrocarbons, is overcome by adding hexane to the displacing zone. Hexane from source 53 is passed by way of valved line 54 and line 56 into heat exchanger 57. The contents of line 56, i. e., hexane from source 53 and recycled hexane are cooled in heat exchanger 57 to +5° C. and introduced by way of line 58 into a lower portion of displacing zone 42, at a point below the entry of displacer from line 51. In this embodiment, 1600 gals./day, i. e., 150 volume percent, of hexane, based on isopropyltoluene introduced from line 41, are introduced into displacing zone 42.

A raffinate phase is withdrawn overhead from zone 42. This consists essentially of hexane, toluene, meta isolpropyltoluene, di-isopropyltoluene and some slight amount of HF and $BF_3$. The raffinate phase is introduced by way of line 61 into fractionation zone 62. This zone 62 is shown schematically since one skilled in the distillation art can devise the proper method of separating the raffinate phase into a hexane fraction, also including the HF and $BF_3$; a toluene fraction, a product isopropyltoluene fraction and a displacer fraction.

A hexane fraction, which includes the HF and $BF_3$ present in the raffinate phase, is withdrawn and passed by way of lines 66 and 67 to line 56 for reuse in the displacing zone 42.

A toluene fraction is withdrawn from zone 62 and is recycled, in part, by way of lines 71 and 72. Toluene is produced in the disproportionation of isopropyltoluene to di-isopropyltoluene; to maintain a constant ratio of toluene to isopropyltoluene in the charge to mixer 31, toluene is withdrawn from the process by way of valved line 74.

A product fraction consisting essentially of meta isopropyltoluene is withdrawn from zone 62 by way of line 76.

A bottoms fraction of di-isopropyltoluene is withdrawn and recycled by way of lines 78 and 79 to line 48 for reuse in displacing zone 42. Some di-isopropyltoluene is produced in the process; to maintain a constant ratio of displacer to isopropyltoluene introduced to the displacing zone, 4 gals./day of by-product, 1,3,5-di-isopropyltoluene are withdrawn from the process by way of valved line 81.

The extract (acid) phase is withdrawn from displacing zone 42 and is introduced by way of line 86 into decomposing zone 87. Decomposing zone 87 is provided with internal heater 88 and some fractionation means, not shown. The temperature of +40° C. in zone 87 is high enough to readily decompose the HF—$BF_3$ complexes but not high enough to cause the displacer to disproportionate or isomerize to any appreciable extent.

HF vapor and $BF_3$ gas are withdrawn from zone 87 and passed by way of line 91 into heat exchanger 92. In heat exchanger 92, the HF vapors are condensed and a liquid-gas stream is passed by way of line 93 into gas separator 94. $BF_3$ is withdrawn from gas separator 94 and is recycled by way of lines 96 and 29 to mixer 31. Make-up BF₃ is introduced from source 98 by way of valved line 99 into line 96. Liquid HF is recycled by way of lines 101 and 26. Make-up HF is introduced from source 102 by way of valved line 103 into line 101.

The bottoms fraction from decomposing zone 87 consists of hexane, isopropyltoluene, di-isopropyltoluene and toluene. The bottoms fraction is withdrawn and introduced by way of line 106 into fractionation zone 107, shown schematically herein. A hexane fraction is withdrawn and recycled by way of lines 109 and 67, etc. to displacing zone 42. A toluene fraction is withdrawn and recycled by way of lines 111 and 72, etc. to mixer 31. A bottoms fraction of di-isopropyltoluene is withdrawn and recycled by way of lines 113 and 79, etc. to displacing zone 42.

As the conditions in decomposing zone 87 cause some back-isomerization of the meta-isopropyltoluene to the ortho and para isomers, the mixed isopropyltoluene fraction from fractionation zone 107, 50 gals./day, is recycled by way of lines 116 and 13, etc to mixer 31.

What is claimed is:

1. An isomerization process which comprises contacting, under substantially anhydrous conditions, a charge consisting essentially of only one secondary alkyltoluene selected from the class consisting of orthoisopropyltoluene, para isopropyltoluene, mixtures thereof, mixtures of meta isopropyltoluene and a substantial amount of at least one other isomer of isopropyltoluene, ortho secondary butyltoluene, para secondary butyltoluene, mixtures of aforesaid secondary butyltoluenes, and mixtures of meta secondary butyltoluene and a substantial amount of at least one other isomer of secondary butyltoluene, with at least 1 mol of BF₃ per mol of secondary alkyltoluene charged and at least sufficient liquid HF to participate in complex-formation and to dissolve said charge thereby forming a single essentially homogeneous liquid phase, at a temperature of not more than about −30° C. for a time of not more than about 10 minutes at −30° C. and wherein the lower the temperature the longer the time of contacting permissible while avoiding an appreciable amount of disproportionation reaction, and removing HF and BF₃ from said liquid phase under conditions to essentially avoid disproportionation reactions and recovering a secondary alkyltoluene fraction consisting essentially of the meta isomer.

2. The process of claim 1 wherein the HF is present in an amount between about 3 and 50 mols per mol of secondary alkyltoluene charged.

3. The process of claim 1 wherein said secondary alkyltoluene is para isopropyltoluene.

4. The process of claim 1 wherein said secondary alkyltoluene is ortho isopropyltoluene.

5. The process of claim 1 wherein said secondary alkyltoluene is a mixture of all the isomers of isopropyltoluene, which mixture contains substantial amounts of the ortho and para isomers.

6. The process of claim 1 wherein said secondary alkyltoluene is a mixture of all the isomers of secondary butyltoluene, which contains substantial amounts of the ortho and para isomers.

7. An isomerization process which comprises contacting, under substantially anhydrous conditions and in the substantial absence of reactive hydrocarbons, a secondary alkyltoluene selected from the class consisting of ortho isopropyltoluene, para isopropyltoluene, mixtures thereof, mixtures of meta isopropyltoluene and a substantial amount of at least one other isomer of isopropyltoluene, ortho secondary butyltoluene, para secondary butyltoluene, mixtures of aforesaid secondary butyltoluenes, and mixtures of meta secondary butyltoluene and a substantial amount of at least one other isomer of secondary butyltoluene, with at least about 1 mol of BF₃ per mol of secondary alkyltoluene charged and at least sufficient liquid HF to form a distinct acid phase, at a temperature of not more than about −20° C. for a time of not more than about 30 minutes at −20° C., wherein the lower the temperature of contacting the longer the permissible time of contacting, contacting said acid phase with at least about 1 mol of a displacer per mol of secondary alkyltoluene present in said acid phase and substantially simultaneously thereafter with an amount of an inert liquid hydrocarbon sufficient to extract from said acid phase displaced-secondary alkyltoluene, under conditions of temperature and time such that substantially no rearrangement reaction takes place, and separating a separate raffinate phase comprising inert hydrocarbon and secondary alkyltoluene from an acid phase comprising HF, BF₃, displacer and some secondary alkyltoluene, and recovering from said raffinate phase a secondary alkyltoluene comprising essentially the meta isomer, and wherein said displacer is a polyalkylbenzene containing at least 3 alkyl groups that are selected from the class consisting of normal and secondary, which contain not more than 4 carbon atoms.

8. The process of claim 7 wherein said polyalkylbenzene is isodurene.

9. The process of claim 7 wherein said displacer is mesitylene.

10. The process of claim 7 wherein said displacer is 3,5-diisopropyltoluene.

11. The process of claim 7 wherein said displacer is 3,5-di-secondary butyltoluene.

12. The process of claim 7 wherein said hydrocarbon is hexane.

13. The process of claim 7 wherein said hydrocarbon is pentane.

14. An isomerization process which comprises contacting, under substantially anhydrous conditions, a charge consisting essentially of (i) toluene and (ii) only one secondary alkyltoluene selected from the class consisting of ortho isopropyltoluene, para isopropyltoluene, mixtures thereof, mixtures of meta isopropyltoluene and a substantial amount of at least one other isomer of isopropyltoluene, ortho secondary butyltoluene, para secondary butyltoluene, mixtures of aforesaid secondary butyltoluenes, and mixtures of meta secondary butyltoluene and a substantial amount of at least one other isomer of secondary butyltoluene, with at least about 1 mol of BF₃ per mol of secondary alkyltoluene charged and at least sufficient liquid HF to form a distinct acid phase, at a temperature between about −20° C. and about +20° C. for a time at least sufficient to isomerize said secondary alkyltoluene essentially to the meta isomer but not long enough to form appreciable amounts of disproportionation product, contacting said acid phase with at least about 1 mol of a displacer per mol of secondary alkyltoluene present in said acid phase and substantially simultaneously thereafter with an amount of an inert liquid hydrocarbon sufficient to extract from said acid phase displaced-secondary alkyltoluene, under conditions of temperature and time such that substantially no rearrangement reaction takes place, and separating a separate raffinate phase comprising inert hydrocarbon and secondary alkyltoluene from an acid phase comprising HF, BF₃, displacer and some secondary alkyltoluene, and recovering from said raffinate phase a secondary alkyltoluene comprising essentially the meta isomer, and wherein said displacer is a poly-alkylbenzene containing at least 3 alkyl groups that are selected from the class consisting of normal and secondary, which contain not more than 4 carbon atoms.

15. The process of claim 14 wherein the time of contacting is between about 5 minutes and about 2 hours, the longer times corresponding to the lower temperatures.

16. The process of claim 14 wherein the liquid HF is present in an amount between about 5 and 20 mols per mol of secondary alkyltoluene.

17. The process of claim 14 wherein the amount of toluene in said charge is between about 1 mol per mol of secondary alkyltoluene and the limit of solubility in said acid phase.

18. The process of claim 14 wherein said temperature is between about −5° C. and about +5° C. and said time is between about 20 minutes and about 60 minutes, the longer times corresponding to the lower temperatures.

19. The process of claim 14 wherein said inert hydrocarbon is present in an amount between about 50 and 500 volume percent based on secondary alkyltoluene in said acid phase.

20. An isomerization process which comprises (1) contacting, under substantially anhydrous conditions, a charge consisting essentially of, (a) a mixture of isopropyltoluene isomers containing a substantial amount of at least one isomer other than the meta isomer and (b) at least 1 mol of toluene per mol of isopropyltoluene, with between 1 and about 1.5 mols of $BF_3$ and between about 5 and 20 mols of liquid HF, respectively, per mol of isopropyltoluene charged, under conditions to produce a single essentially homogeneous liquid phase of HF, $BF_3$ and charge, at a temperature of between about −5° C. and +5° C. (2) contacting said liquid phase with between about 2 and 4 mols of a di-isopropyltoluene and substantially simultaneously thereafter with a low boiling paraffin, in an amount between about 100 and 250 volume percent based on isopropyltoluene in said liquid phase, at a temperature between about −5° C. and +5° C., wherein the time of contacting in step (1) and (2) is not enough to permit the formation of significant amounts of di-isopropyltoluene, (3) separating a raffinate phase comprising paraffin and isopropyltoluene from an acid phase comprising HF, $BF_3$ and di-isopropyltoluene, (4) recovering from said acid phase di-isopropyltoluene and isopropyltoluene isomers and (5) recovering from said raffinate phase an isopropyltoluene fraction consisting essentially of meta isopropyltoluene.

21. An isomerization process which comprises contacting, under substantially anhydrous conditions and in the substantial absence of reactive hydrocarbons, a di-secondary alkyltoluene selected from the class consisting of an isomer other than the 1,3,5-isomer and mixtures of the 1,3,5-isomer and a substantial amount of at least one other isomer of di-isopropyltoluene and secondary di-butyltoluene, with at least about 1 mol of $BF_3$ per mol of di-secondary alkyltoluene charged and at least sufficient liquid HF to form a distinct acid phase, at a temperature of between about +10° and +30° C. for a time sufficiently short to substantially avoid disproportionation reactions, and removing HF and $BF_3$ from said acid phase under conditions to substantially avoid rearrangement reactions and recovering from the reaction product a di-secondary alkyltoluene fraction comprising substantially the 1,3,5-isomer.

22. The process of claim 21 wherein the said $BF_3$ usage is between at least 1 and 2 mols and said HF usage is between about 5 and 20 mols, respectively, per mol of di-secondary alkyltoluene.

23. The process of claim 21 wherein said chafge consists essentially of at least one isomer of di-isopropyltoluene other than the 1,3,5-isomer.

References Cited in the file of this patent

UNITED STATES PATENTS

| | | |
|---|---|---|
| 2,521,444 | Brooke | Sept. 5, 1950 |
| 2,527,824 | Kemp | Oct. 31, 1950 |